INVENTOR
LEON A. HURWITZ
JOHN H. SWARR

ATTORNEY

United States Patent Office

3,097,980
Patented July 16, 1963

1

3,097,980
HEAT TREATMENT OF STAINLESS STEEL
John Howard Swarr, Lititz, and Leon A. Hurwitz, Lancaster, Pa., assignors to Hamilton Watch Company, Lancaster, Pa., a corporation of Pennsylvania
Filed Aug. 22, 1957, Ser. No. 679,648
6 Claims. (Cl. 148—135)

This invention relates to a heat treating method for controlling the size of parts made of martensitic high alloy steel and more particularly stainless steel.

In the manufacture of small metal parts to tolerances on the order of .0001 to .0005 inch it is commonplace to experience a relatively high percentage of rejects because of failure of the parts to conform to specified dimensions. Since this spoilage occurs after the machining operation has been completed, the cost of these rejects includes not only the cost of the material, but also certain fabrication costs. This obviously increases the unit cost of the parts which ultimately pass inspection.

The use of stainless steel for fuel injection nozzles, strainer bodies, bushings and machine and instrument components has many advantages. Among these are their resistance to corrosion, erosion and abrasion. The martensitic grades of stainless steel are generally used because of their susceptibility to hardening by thermal treatment. This makes it possible to perform processing operations, such as machining, in the soft or unheat-treated condition, and subsequently harden the parts by heat-treating after they have been machined, lapped or ground to finish size. Because of the close size tolerances specified on stainless steel parts for many precision applications, a high rate of rejections can result after production, machining, grinding and lapping. Over and under size holes in the parts make them unusable for the intended application and result in costly rejections.

We have now found that it is possible to bring substantially all of the martensitic stainless steel parts which exceed tolerances within the tolerance limits through a certain heat treating process. According to our process the dimension changes which are produced are predictable, reproducible and permanent. The process can be controlled so that the parts are expanded, contracted, or maintained at precisely the same size. Since the process may be applied to fabricated or machined parts it becomes possible to eliminate a large amount of the spoilage which has heretofore occurred because of failure to meet specification dimensions within small tolerances.

It is accordingly a primary object of the present invention to provide a heat treating method for varying the dimensions of high alloy martensitic steel parts of varying dimensions to bring all parts to predetermined dimensions within specified tolerances.

It is another object of the invention to carry out the foregoing process by stress relieving all of the parts of a certain type under substantially the same conditions following a previous hardening heat treatment at a temperature and for a period of time determined by the amount that each specific part varies from the predetermined dimensions.

These and further objects and advantages of the invention will become more apparent upon reference to the following specification and claims and appended drawings wherein:

2

Figure 4:
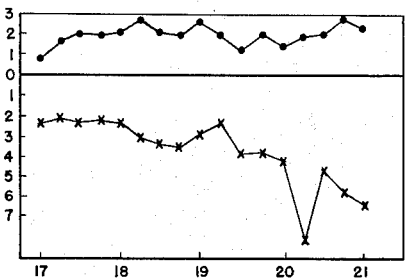

FIGURE 4 is a similar graph showing a still further part; and

Figure 5:
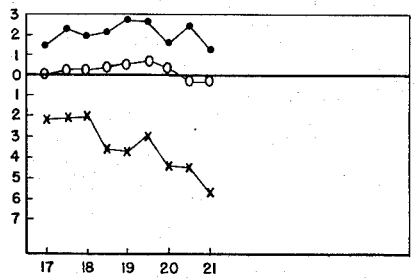

FIGURE 5 is still a further graph for a still different part.

The hardening of martensitic stainless steel is usually accomplished by heating to a temperature range of 1800 to 1950° F. and rapidly cooling to room temperature. At the hardening temperature range of 1800 to 1950° F. the iron and chromium carbides present in the stainless steel partially dissolve in gamma iron to form austenite, the amount being dependent on the carbon content, time and temperature. Austenite is a solution of the carbides in gamma iron and has a crystalline face centered cubic lattice structure. This structure is close packed and relatively dense. On cooling to room temperature, the austenite, which is soft, transforms to a hard constituent called martensite. A rearrangement of the atoms takes place resulting in a new body centered cubic space lattice. Since this arrangement of the atoms is less dense than the face centered cubic lattice of austenite, expansion of the steel takes place when practically all of the austenite changes to martensite. That is, the body centered space lattice of the martensite occupies more space than the face centered lattice of austenite causing an expansion.

When the amount of carbon which dissolves in the austenite exceeds a certain amount, this expansion does not occur, but on the contrary, a contraction takes place as the amount of dissolved carbon is increased. The amount of carbon which dissolves can be controlled by a control of the hardening temperature, the higher temperatures generally producing a higher amount of dissolved carbon.

In the conventional heat treatment of stainless steel the machined or otherwise formed pieces are hardened at a temperature range of around 1800 to 1950 degrees F., cooled, and then stress relieved or tempered at a temperature of around 300 to 600 degrees F. While the formation of austenite occurs only at hardening temperatures and not at the lower stress relieving temperatures, it has been found that the stress relief temperatures do have some effect upon the dimensions of the parts. On the other hand, we have found that, as a practical matter, it is impossible to control the dimensions of the parts by controlling the stress relieving temperature, since the temperature which might be indicated to produce the desired dimension change might also produce an unsatisfactory hardness.

Figure 2:
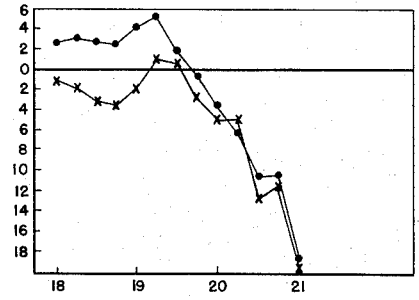
FIGURE 2 is a graph wherein dimensional changes in tens of thousandths of inches are plotted against hardening temperatures plotted in hundreds of degrees Fahrenheit showing two different dimensions of a specific part.

According to our invention the stress relieving temperature and time of treatment is maintained substantially constant for any given series of pieces to be produced. Assuming that a stress relieving temperature has been chosen based upon the specific alloy of which the part is made and the hardness desired in the finished part, the next step in our process is an accurate determination of the effect of a variation of hardening temperature on the dimensions of the specific part. Consider as an example the treatment of pieces made of type 440 C stainless steel having a composition range of carbon 0.95 to 1.20 percent, manganese 1.00 percent max., silicon 1.00 percent max., chromium 16.00 to 18.00 percent, molybdenum 0.75 percent max., and the remainder, iron. FIGURE 2 shows the data obtained for pieces one inch long and 0.5 inch in diameter.

Figure 1:
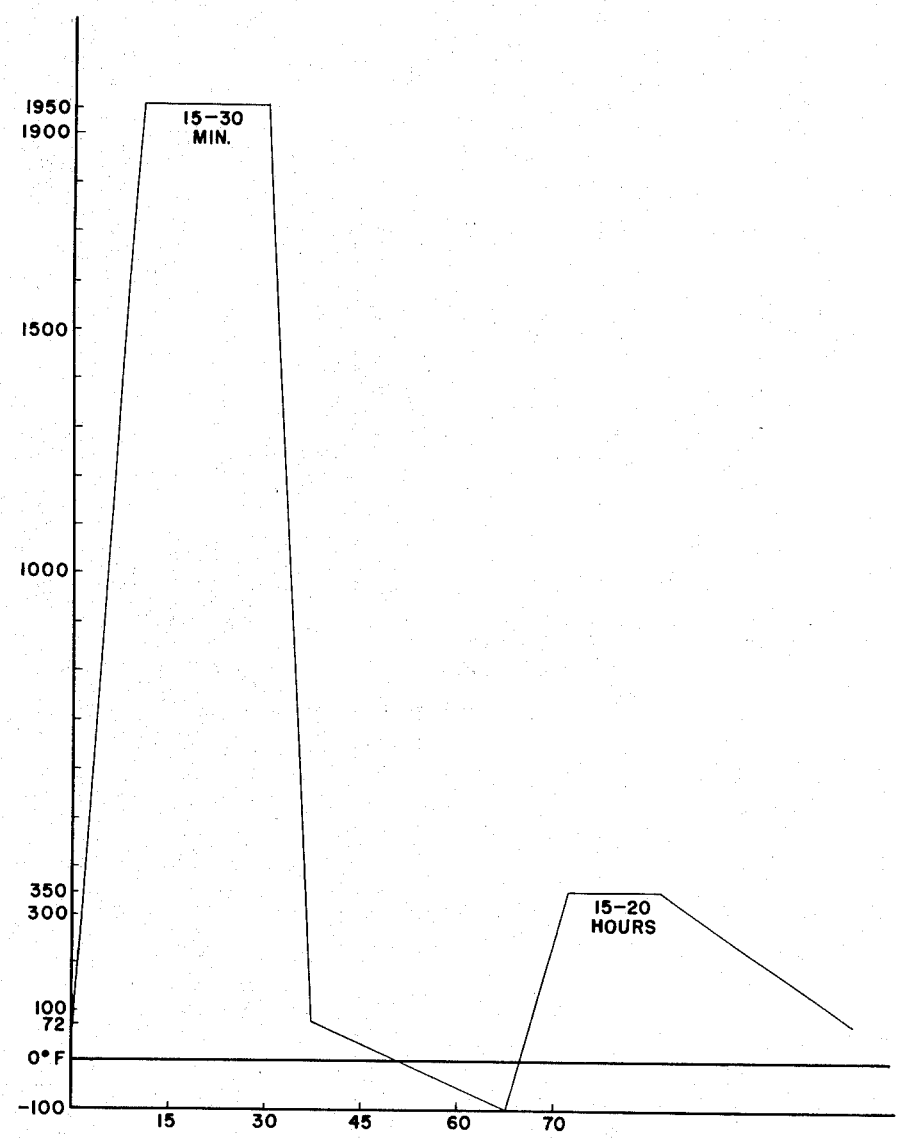
FIGURE 1 is a diagram showing the heat treatment of martensitic stainless steel parts according to the invention.

A series of parts of substantially the same dimensions were selected and each part carefully measured. Each part was then subjected to hardening at a different temperature but stress relieved at the same temperature. In this specific case all parts were heated to and maintained at the hardening temperature for a period of 20 minutes and were stress relieved at 300° F. for a period of 15 hours. Referring to FIGURE 1, the actual cycle of our method is indicated diagrammatically showing the temperature of the hardening and stress relieving steps plotted against time. With the particular furnace in which the heat treatment was carried out, the parts were heated to the hardening temperature in approximately 10 minutes, maintained at the hardening temperature for a period of 20 minutes in an atmosphere of dry hydrogen free of oxygen, and rapidly cooled to room temperature in the hydrogen atmosphere by means of a water cooled jacket. The parts were then removed from the furnace and subjected to a chilling step to bring the temperature of the parts down to approximately minus 100° F. within approximately 30 minutes. The parts were then replaced in the oven and heated to the stress relieving temperature of 300° F. in approximately 10 minutes and were maintained at this temperature for 15 hours. The parts were cooled to room temperature in approximately 30 minutes and again measured. The changes in length and diameter of the parts was plotted against the hardening temperature as shown in FIGURE 2. Referring to that figure the ordinate above the horizontal line represents an increase in dimension in tens of thousandths of an inch, while the ordinate below the horizontal line represents a decrease in dimension in tens of thousandths of an inch. The abscissa represents temperature in hundreds of degrees Fahrenheit. The upper curve represents the change in diameter, while the lower curve represents the change in length.

Referring to these curves it will be seen that a part having a diameter and length as much as 18 ten-thousandths oversize may be brought within tolerance by heat-treating according to our process and carrying out the hardening at a temperature of 2100° F. Similarly a part having a diameter as much as 5.5 ten-thousandths undersize may be brought within tolerance by heat treating according to our process and hardening at a temperature of 1925° F. It will be obvious from the chart that except in some instances it is impossible to simultaneously correct both the length and diameter by independently predetermined amounts. This, however, is not generally a serious drawback in practice since it is normally desired to maintain only one dimension to extreme accuracy.

Figure 3:
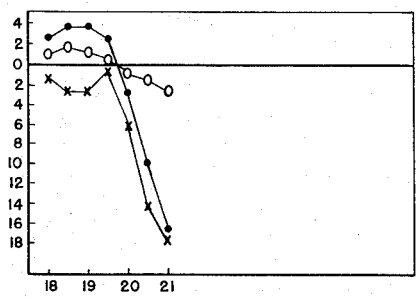
FIGURE 3 is a graph similar to FIGURE 2 showing three dimensions of a different part.

Referring to FIGURE 3 there is shown another example of the application of our process to tubular pieces of type 440 C stainless steel tube one inch long, 0.5 inch in diameter, and having an inside diameter of .125". The upper curve shows the dimensional change in the outside diameter; the middle curve, the change in the inside diameter; and the lower curve, the change in length. The treatment utilized in obtaining this data was similar to that described in connection with FIGURE 2.

FIGURE 4 presents the data obtained on the same size and type sample as utilized in FIGURE 2, but made from type 416 stainless steel having a composition range of carbon 0.08 to 0.15 percent, manganese 1.25 percent max., silicon 1.00 percent max., chromium 12.00 to 14.00 percent, phosphorous 0.04 percent max., sulphur 0.18 to 0.35 percent, and molybdenum 0.60 percent max. It will be noted that the magnitude of dimensional change which is secured with this type of stainless steel is not as substantial as that which is obtained with the type 440 C grade. This is due to the fact that the dimensional changes are a function of the carbon content of the steel and are smaller with the type 416 steel having a carbon range of 0.08 to 0.15 as compared to type 440 C steel having a carbon range of 0.95 to 1.20 percent.

FIGURE 5 shows the data obtained with a part of the same type and size as that used in obtaining the data in FIGURE 3, but also of a type 416 stainless steel.

In the application of our process to the manufacture of small parts of high alloy martensitic steel, a chart of the foregoing type is first obtained through the preliminary determinations described herein. After this chart has been obtained, manufacture is continued and the out of tolerance parts are segregated into groups according to the dimensional change necessary to bring them within tolerance. That is to say, a first group may be collected wherein the diameter must be increased two ten-thousandths, a second group may be collected wherein the diameter must be increased three ten-thousandths, a third group may be collected wherein the diameter must be increased five ten-thousandths. Similarly other groups may be collected wherein the diameter must be decreased by specified amounts. A single group of one type is then placed in the oven and heat-treated at the hardening temperature which the chart indicates is necessary to bring about the desired dimensional change. It will be noted that some of the curves, as, for instance, the upper curve in FIGURE 5, indicate that an increase in diameter of two ten-thousandths may be obtained at a number of different temperatures. While any one of these temperatures could be used in the hardening process, it is most economical to use the lowest temperature which will bring about the desired dimensional change.

Referring to FIGURE 1, which represents the heat-treatment of martensitic stainless steel, the pieces should be maintained at the hardening temperature for a period of approximately 15 to 30 minutes for pieces of a diameter no greater than 0.5 inch. Cooling should then be rapid down to room temperature, that is 15 to 20 minutes, and the pieces should then be cooled to approximately −100° F. in about 30 minutes. During the entire time that the parts are at elevated temperatures in the hardening treatment they are maintained in an atmosphere of dry hydrogen to maintain the brightness of the surface finish and to prevent any oxidation of the parts. The cooling to −100° F. insures that the transformation process from austenite to martensite is completed, so that further dimensional changes do not occur over a period of time. This cooling must be to a temperature below 0° F. and preferably to about −100° F. Whereas ordinary stress-relieving is generally carried out for relatively short periods of time in the neighborhood of two hours, we have found that it is desirable to stress-relieve parts treated according to our process for considerably longer periods of time in the range of 12 to 20 hours. This further stabilizes the parts and it is subsequently found that the austenite which remains in the material is stable and at ordinary temperatures will not change to martensite. The dimensional changes obtained are thus quite permanent.

Through the use of our process it is possible to salvage numerous parts which would otherwise have to be rejected because of failure to conform to dimensional tolerances. The unit cost of parts produced is thus lowered and the increase in the cost of heat treatment is almost negligible where a high volume of parts is being handled. While the process has been discussed in connection with stainless steel, it is also applicable to other types of high alloy steel, such as steels containing chromium, tungsten, molybdenum, vanadium, etc.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. A process for heat treating a series of martensitic stainless steel parts of slightly varying sizes to bring all parts to substantially the same size within specified tolerances comprising preparing a record of variation in linear dimensions of said parts at the completion of the following recited process as a function of solution heating at different temperatures, and carrying out the following steps which are recited in reverse order: stress relieving all said parts at substantially the same temperature within the range of 300–600° F., chilling all said parts to at least as low as −100° F., solution heating parts of different sizes at different temperatures within the range of about 1700–2100° F. which said record indicates will cause dimensional changes to bring all said parts within tolerance.

2. A process as set out in claim 1 wherein said stress relieving is carried on at a temperature of 300–600° F. for a period of at least 12 hours.

3. A process as set out in claim 1 wherein said parts have a diameter less than an inch and said solution heating is carried on for a period of approximately 15–30 minutes after the parts reach the solution heating temperature.

4. A process as set out in claim 3 wherein the parts are rapidly cooled to room temperature after solution heating and before chilling and are chilled to at least as low as −100° F. in about 30 minutes.

5. A process for heat treating a series of slightly oversize high alloy martensitic steel parts to bring all parts to substantially the same size within specified tolerances, comprising preparing a record of variation in linear dimensions of said parts at the completion of the following recited process as a function of solution heating at different temperatures, and carrying out the following steps which are recited in reverse order: stress relieving all said parts at substantially the same temperature, chilling all said parts below zero degrees F., and solution heating parts of different sizes at different temperatures which said record indicates will cause dimensional changes to bring all said parts below tolerance.

6. A process for heat treating a series of slightly oversize and slightly undersize high alloy martensitic steel parts to bring all parts to substantially the same size within specified tolerances comprising preparing a record of variation in linear dimensions of said parts at the completion of the following recited process as a function of solution heating at different temperatures, and carrying out the following steps which are recited in reverse order: stress relieving all said parts at substantially the same temperature, chilling all said parts below zero degrees F., solution heating parts of different sizes at different temperatures which said record indicates will cause dimensional changes to bring all said parts within tolerance.

References Cited in the file of this patent

Gippert et al.: Changes in Size and Toughness of High Carbon-High Chromium Steels Due to Subzero Treatments, by L. E. Gippert and G. M. Butler, Jr., Transactions of American Society for Metals, vol. 39, 1947, pages 549–568.

McShane et al.: Size Changes of Steel Rings During Heat Treatment, by C. P. McShane and R. W. Bratt, Tool Engineer, vol. 37, October 1956, pages 81–84.